W. M. RICE & J. I. RANDALL.
CHEESE CUTTER AND CABINET.
APPLICATION FILED APR. 3, 1915.
1,168,964.
Patented Jan. 18, 1916.
2 SHEETS—SHEET 1.
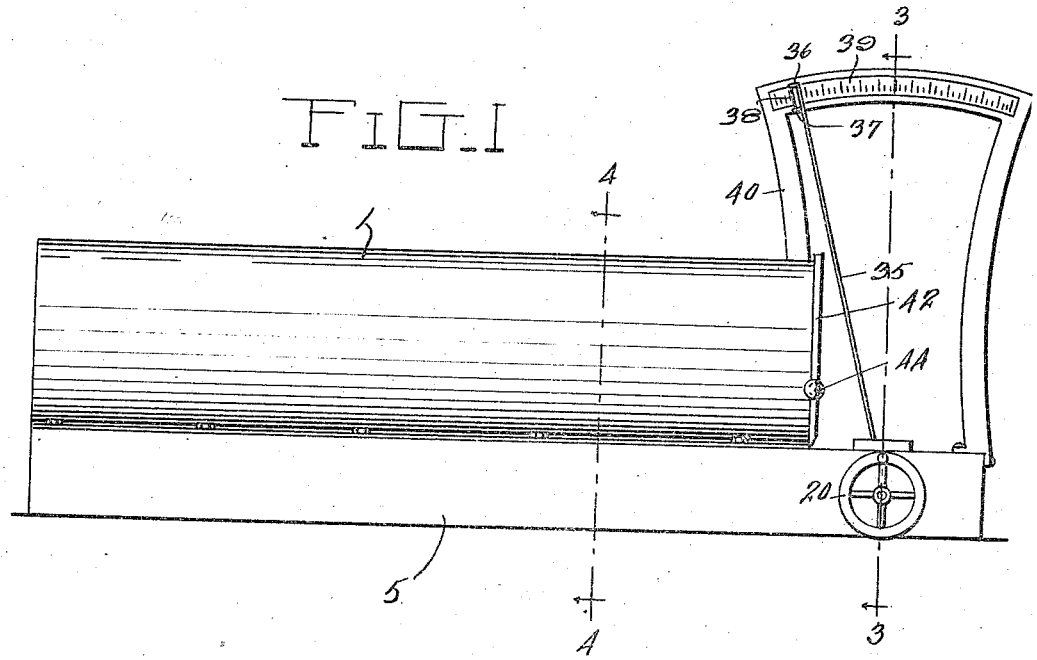
FIG. 1
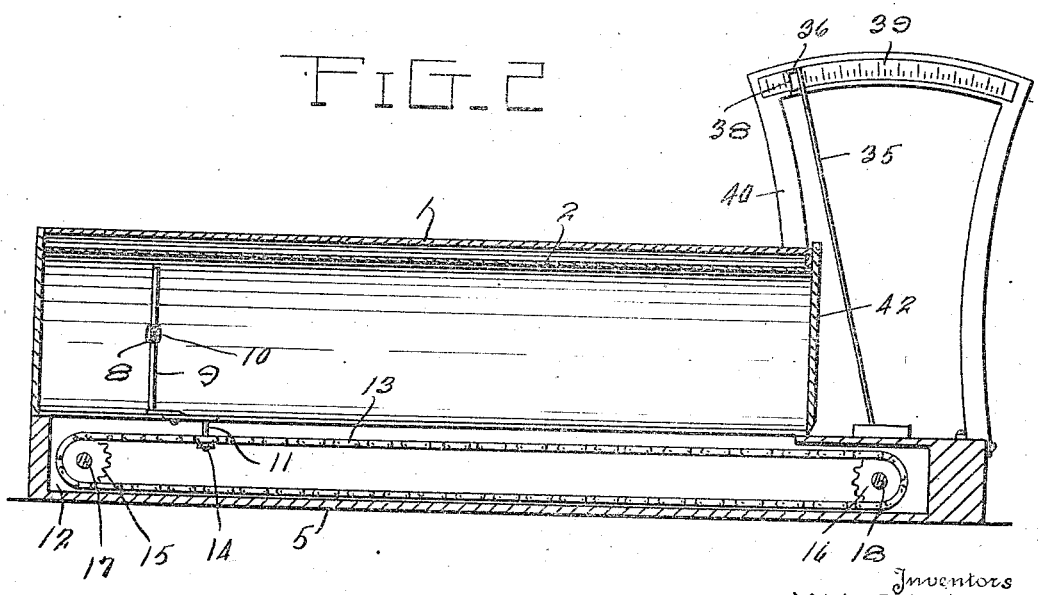
FIG. 2
Witnesses
Chas. H. Trotter
Rob't Meyer
Inventors
W. M. Rice
& J. I. Randall
Attorney

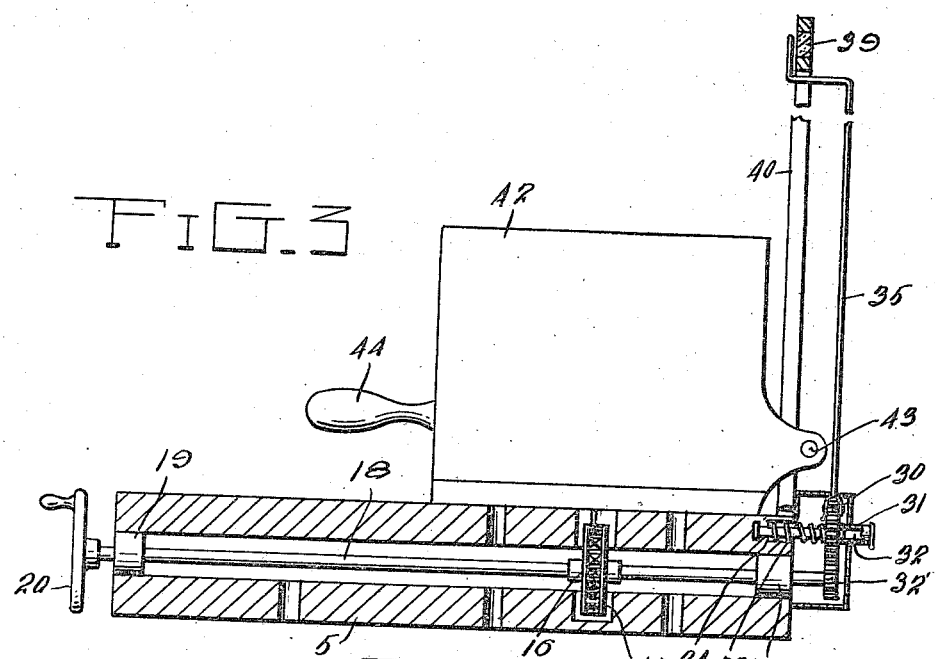
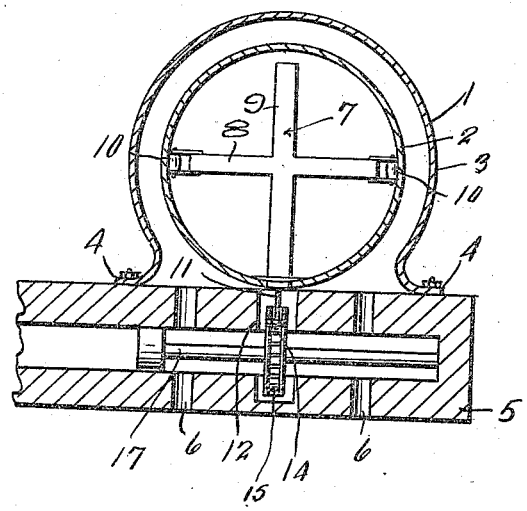
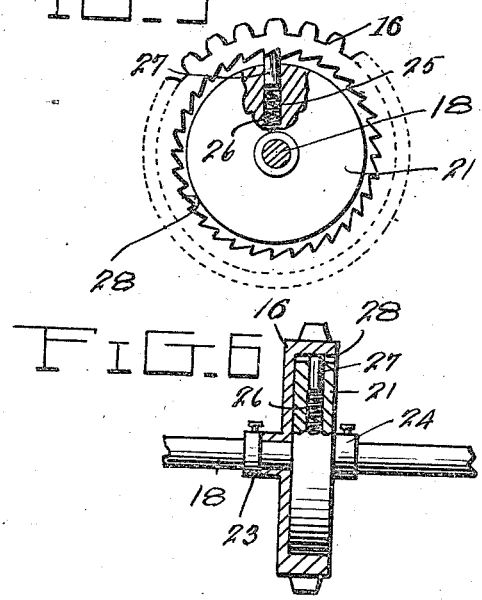

UNITED STATES PATENT OFFICE.

WELBY M. RICE AND JOHN I. RANDALL, OF MANASSAS, VIRGINIA.

CHEESE CUTTER AND CABINET.

1,168,964.    Specification of Letters Patent.    Patented Jan. 18, 1916.

Application filed April 3, 1915. Serial No. 18,995.

*To all whom it may concern:*

Be it known that we, WELBY M. RICE and JOHN I. RANDALL, citizens of the United States, residing at Manassas, in the county of Prince William and State of Virginia, have invented certain new and useful Improvements in Cheese Cutters and Cabinets; and we do hereby declare the following to be a full, clear, and exact description of the invention, such as will enable others skilled in the art to which it appertains to make and use the same.

This invention relates to dispensing cabinets for food stuffs, such as the type of cheese commercially known as long horn cheese, and the primary object of the invention is to provide a device for retaining and dispensing food stuffs which includes a housing for encompassing the same, having a knife pivotally connected to one end thereof, out of which end the cheese or food stuff is fed, for dispensing the same, and further to provide an indicator which co-acts with a graduated scale for determining the amount of cheese dispensed.

Another object of this invention is to provide means for feeding the cheese outwardly from the retaining or encompassing housing, and also to provide means for permitting the indicator to return to its normal position, and means for throwing the indicator out of gear when refilling the cabinet.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved cheese cabinet and cutter, Fig. 2 is a longitudinal section through the cabinet and cutter, Fig. 3 is a cross section on the line 3—3 of Fig. 1, Fig. 4 is a cross section on the line 4—4 of Fig. 1, Fig. 5 is a fragmentary view of the means for controlling the operation of the indicator, and Fig. 6 is a cross sectional view through Fig. 5.

Referring more particularly to the drawings, 1 designates the cheese retaining housing, which is composed of inner and outer casings 2 and 3. The inner casing 2 is substantially circular in cross section, and is supported in spaced relation with respect to the inner surface of the outer casing 3, which is also substantially circular shaped in cross section and has its lower marginal edges 4 flared outwardly and secured to the upper surface of a supporting base 5. The supporting base 5 is provided with a plurality of vertically extending passages 6, which are provided for permitting of the circulation of air within the space between the casings 2 and 3.

The casing 1 has a feeder 7 mounted interiorly therein, which is composed of crossed bars 8 and 9, positioned for forming a "Georgian" cross. The bar 8 has rollers 10 rotatably supported upon its outer end which engage the inner surface of the inner casing 2, for relieving the friction during the travel of the feeder, and for holding it properly positioned within the interior of the casing 2. The lower end of the bar 9 has a depending finger 11 formed thereupon, which extends downwardly into a recess 12 formed in the base 5 and engages a sprocket chain 13, to which it is attached, as is shown at 14 in Figs. 2 and 4 of the drawings. The sprocket chain 13 travels about sprockets 15 and 16, which are mounted upon shafts 17 and 18 carried by the front and rear ends of the base 5. The shaft 18 is journaled in bearings 19, carried by the bottom or supporting base 5, and it extends transversely through the same, having a hand wheel 20 mounted upon its outer end, which projects out of one side of the base 5.

The shaft 18 has a wheel 21 keyed thereon, which wheel is positioned within the sprocket 16, which is rotatably mounted upon the shaft 18 and is held against accidental longitudinal displacement by means of a collar 23. The disk 21 is also held against longitudinal displacement upon the shaft by means of a collar 24. The disk 21 is provided with a radially extending recess 25 formed therein, in which is positioned a spiral spring 26. The outer end of the spring 26 rests against a pawl 27, which pawl is provided for engagement with the ratchet teeth 28, which are formed on the inner wall of the sprocket 22. The sprocket 22 is provided with a facial recess, as is clearly shown in Fig. 6 of the drawings, and the disk 21 is positioned interiorly thereof.

The pawl 27 is positioned so that upon the rotation of the shaft 18, for feeding the feeder or traveler 7 outwardly, the pawl will engage one of the abrupt shoulders of the ratchet teeth, and rotate the sprocket 22 synchronously with the rotation of the shaft, and also so that it will permit the disk 21 to rotate independent of the sprocket 22 when the shaft 18 is rotated for returning the traveler or feeder 7 to the rear end of the housing 2.

The gear 32' meshes with a gear 30, which is carried by a sleeve 31. The gear 32' is mounted upon the shaft 18. The sleeve 31 is slidably mounted upon a pin 32, and has a spiral spring 33 engaging its inner end. The spiral spring 33 is coiled about the pin 32, and extends into a recess 34 which is formed in the base 5, as is clearly shown in Fig. 3 of the drawings.

The gear 30 has an indicating hand 35 connected thereto, for swinging movement upon rotation of the gears. The indicating arm 35 extends upwardly from the gear 30, and has a pair of transversely extending fingers 36 and 37 formed upon its upper ends, to which is secured a wire 38, which extends from one finger to the other, and forms an indicator for co-action with a scale 39 carried by an upstanding support 40. The scale 39 is preferably formed upon a transparent plate, so that the wire 38 may be visible upon either side of the same.

The housing 1 has a cutting knife 42 pivotally connected to the forward end thereof, as is indicated at 43, the lower edge of which knife is provided for cutting the cheese. A handle 44 is secured to the knife for facilitating the manual oscillatory or pivotal movement of the same.

The housing 1 may be composed of casings either circular, or rectangular in cross section, depending upon the type of material to be dispensed by the device. Furthermore, it is to be understood that various types of prepared meat, or loaves of analogous material may be dispensed and cut by the improved cabinet and cutter heretofore described, without departing from the spirit of this invention.

When it is desired to place a cake of cheese, or like food products within the casing, the sleeve 31 is forced inwardly against the tension of the spring 33, which will move the gear 30 out of meshing engagement with the gear 22, permitting the latter gear to rotate without imparting rotation to the gear 30. After the gears have been moved out of mesh, the shaft 18 is rotated through the medium of the handle 20, for feeding the feeder or traveler 7 to the rear end of the interior casing 2, after which the knife 42 is moved upon its pivotal connection for opening the open end of the casing, and permitting the insertion of the loaf or cake of food stuff therein. After the food stuff has been properly positioned within the interior casing 2, and it is desired to dispense the same therefrom, the pressure upon the sleeve 31 is released, which permits the gear 30 to move into meshing engagement with the gear 32', and the knife 42 is moved upwardly on its pivotal point, after which the shaft 18 is rotated for feeding the loaf or cake of food stuff out of the casing 1. The amount of food stuff fed out of the casing, will be designated by the position of the wire 38, upon the scale 39, and thus any predetermined amount may be fed out of the casing. After the desired amount has been fed from the mouth of the casing, the knife 42 is moved downwardly, severing the same. The knife 42 forms a closure for the dispensing end of the casing, as well as serving the purpose of a knife for severing the desired quantity from the main loaf or body of the food stuff.

After the cheese has been cut, the construction of the ratchet 16 will permit the indicator 35 to swing to zero on the graduated scale without necessitating reverse movement of the feeder.

If it is so desired, the cheese cutter and cabinet may be placed upon an ice-box, so that the vent openings or passages 6 will communicate with the cooling chamber of the box for causing a circulation of cool air within the space between the outer casing 3 and the inner casing 2 for maintaining the proper temperature therein for preventing the deterioration of the food stuffs contained in the inner casing.

From the foregoing description taken in connection with the accompanying drawings the advantages of construction and of the method of operation of the improved cheese cutter and cabinet will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a device as set forth, a retaining casing composed of spaced inner and outer casings, a feeder positioned within said interior casing, a supporting base, and means carried by said supporting base for moving said feeder longitudinally through said interior casing.

2. In a device as set forth, a retaining casing composed of spaced inner and outer casings, a feeder positioned within said interior casing, a supporting base, means carried by said supporting base for moving said feeder longitudinally through said interior casing, a knife pivotally connected to the open end of said casing and forming a closure therefor.

3. In a device as set forth, a supporting base, a casing mounted upon said base and composed of inner and outer casings, said inner casing being spaced inwardly from the interior of said outer casing, air ducts extending through said supporting base and communicating with the space between said inner and outer casings for permitting of the circulation of air therein.

4. In a device as set forth, a supporting base, a casing mounted upon said base and composed of inner and outer casings, said inner casing being spaced inwardly from the interior of said outer casing, air ducts extending through said supporting base and communicating with the space between said inner and outer casings for permitting of the circulation of air therein, a feeder mounted within said interior casing, means carried by said base for moving said feeder longitudinally within said interior casing.

5. In a device as set forth, a supporting base, a casing mounted upon said base and composed of inner and outer casings, said inner casing being spaced inwardly from the interior of said outer casing, air ducts extending through said supporting base and communicating with the space between said inner and outer casings for permitting of the circulation of air therein, a feeder mounted within said interior casing, means carried by said base for moving said feeder longitudinally within said interior casing, a knife pivotally connected to the open outlet end of said casing, said knife normally forming a closure for said casing, and means for registering the quantity of the food stuff fed out of said casing.

6. In a device as set forth, a food stuff retaining casing, a feeder positioned within said casing, means for moving said feeder longitudinally within said casing for feeding food stuff out of the open end of said casing, a knife pivotally connected to the open end of said casing and forming a closure therefor, and means operable by the movement of said feeder for registering the quantity of food stuff fed out of said casing, said last named means including an oscillatory finger, a scale for co-action with said oscillating indicating finger.

7. In a device as set forth, a food stuff retaining casing, a supporting base therefor, a feeder mounted within said casing, an oscillatory indicating finger, a scale for co-action with said indicating finger for registering the quantity of food stuff fed out of said casing, means for operating said swingable finger synchronously with the forward movement of food stuff in said casing, and means for permitting of the rearward movement of said feeder without operating said finger.

8. In a device as set forth, a food stuff retaining casing, a supporting base therefor, a feeder mounted within said casing, a sprocket chain carried by said supporting base, means connecting said feeder and said sprocket chain for moving said feeder longitudinally within said casing upon motion of said sprocket chain, an oscillatory indicating finger, a scale for co-action with said indicating finger for registering the quantity of food stuff fed out of said casing by said feeder, means for operating said oscillatory finger synchronously with the forward movement of said feeder, and means for permitting of the rearward movement of said feeder without operating said finger.

9. In a device as set forth, a food stuff retaining housing including an outer casing, an inner casing positioned interiorly of said outer casing and spaced from the inner walls thereof, a supporting base, said supporting base being provided with air ducts to permit of the circulation of air within the space between said casings, a feeder positioned within said interior casing, a pair of shafts rotatably carried by said supporting base, sprockets mounted upon said shafts, a sprocket chain for travel about said sprockets, means connecting said feeder and said sprocket chain for moving said feeder longitudinally within said interior casing upon movement of said sprocket chain, a gear mounted upon one of said shafts, a second gear carried by said supporting base, an indicating finger connected to said second named gear for swinging movement upon rotary movement of the gears, a scale for co-action with said swinging indicating finger for registering the quantity of food stuff fed out of said interior casing, and means for moving said second named gear out of meshing engagement with said first named gear, and means for permitting of the rearward movement of said feeder within said interior casing without imparting movement to said indicating finger.

10. In a device as set forth, a food stuff retaining housing including an outer casing, an inner casing positioned interiorly of said outer casing and spaced from the inner walls thereof, a supporting base, said supporting base being provided with air ducts to permit of the circulation of air within the space between said casings, a feeder positioned within said interior casing, a pair of shafts rotatably carried by said supporting base, sprocket mounted upon said shafts, a sprocket chain for travel about said sprockets, means connecting said feeder and said sprocket chain for moving said feeder longitudinally within said interior casing upon movement of said sprocket chain, a gear mounted upon one of said shafts, a second gear carried by said supporting base, an indicating finger connected to said second named gear for swinging movement upon rotary movement of the gears, a scale for coaction with said swinging indicating finger for registering the quantity of food stuff fed out of said itnerior casing, means for moving said second named gear out of meshing engagement with said first named gear, means for permitting of the rearward movement of said feeder within said interior casing without imparting movement to said indicating fingers, and a knife pivotally connected to the forward end of said casing and normally forming a closure therefor.

In testimony whereof we affix our signatures in presence of two witnesses.

WELBY M. RICE.
JOHN I. RANDALL.

Witnesses:
ROBT. A. HUTCHISON,
K. N. HOLDEN.

Copies of this patent may be obtained for five cents each, by addressing the "Commissioner of Patents, Washington, D. C."